(12) United States Patent
Onorato Estevez et al.

(10) Patent No.: US 11,351,944 B2
(45) Date of Patent: Jun. 7, 2022

(54) AIRBAG SYSTEM FOR A VEHICLE AND METHOD FOR MANUFACTURING THE AIRBAG SYSTEM

(71) Applicant: FAURECIA INTERIEUR INDUSTRIE, Nanterre (FR)

(72) Inventors: David Onorato Estevez, Barcelona (ES); Javier Martinez-Lera, Barcelona (ES); Laurent Petit, Strasbourg (FR)

(73) Assignee: FAURECIA INTERIEUR INDUSTRIE, Nanterre (FR)

(*) Notice: Subject to any disclaimer, the term of this patent is extended or adjusted under 35 U.S.C. 154(b) by 26 days.

(21) Appl. No.: 16/856,615

(22) Filed: Apr. 23, 2020

(65) Prior Publication Data
US 2020/0339057 A1     Oct. 29, 2020

(30) Foreign Application Priority Data

Apr. 24, 2019 (EP) .................................... 19305529

(51) Int. Cl.
*B60R 21/205* (2011.01)
*B60R 21/216* (2011.01)
*B60R 21/16* (2006.01)

(52) U.S. Cl.
CPC .......... *B60R 21/205* (2013.01); *B60R 21/216* (2013.01); *B60R 2021/161* (2013.01)

(58) Field of Classification Search
CPC ... B60R 21/205; B60R 21/215; B60R 21/216; B60R 2021/161; B60R 2021/21537; B60R 2021/2161

See application file for complete search history.

(56) References Cited

U.S. PATENT DOCUMENTS 5,069,477 A * 12/1991 Shiraki ............. B60R 21/21656
                                                    280/732
5,346,249 A   9/1994 Hallard et al.
5,639,115 A * 6/1997 Kelley ................ B60R 21/2165
                                                    280/728.3

(Continued)

FOREIGN PATENT DOCUMENTS

DE  102009048686 A1  4/2011
EP      0582443 A1   2/1994

(Continued)

OTHER PUBLICATIONS

European Search Report corresponding to European Application No. 19305529.0, dated Nov. 9, 2019, 8 pages.

*Primary Examiner* — Laura Freedman
(74) *Attorney, Agent, or Firm* — Reising Ethington P.C.

(57) ABSTRACT

A safety device for a vehicle adapted to be arranged facing an airbag, the safety device including: a channel suitable for guiding the airbag, the channel delimiting a central opening for deployment of the airbag, a panel at least partially covering the central opening when the airbag is in an uninflated state, and a net having a first plane-portion being entrapped in the channel and a second plane-portion being entrapped in the panel. The net further includes a third portion extending between the first plane-portion and the second plane-portion, at least a part of the third-portion being entrapped in a receiving portion of the channel, wherein the receiving portion includes at least a portion of reduced thickness.

14 Claims, 4 Drawing Sheets

(56) References Cited

U.S. PATENT DOCUMENTS

| | | | |
|---|---|---|---|
| 5,901,976 | A | 5/1999 | Kreuzer et al. |
| 7,992,890 | B2* | 8/2011 | Nogaret ................ B60R 21/215 |
| | | | 280/728.3 |
| 9,045,106 | B2* | 6/2015 | Pauthier ................. B29C 45/14 |
| 9,573,545 | B1 | 2/2017 | Kong |
| 9,669,791 | B2* | 6/2017 | Svensson .......... B29C 45/14786 |
| 11,230,249 | B2* | 1/2022 | Nogaret ................ B60R 21/215 |
| 2014/0117649 | A1 | 5/2014 | Hoeing et al. |
| 2018/0194319 | A1 | 7/2018 | Lesnik et al. |
| 2019/0329727 | A1 | 10/2019 | Onorato Estevez |
| 2021/0162943 | A1* | 6/2021 | Schulze-Wehnink ........................ |
| | | | B60R 21/2165 |

FOREIGN PATENT DOCUMENTS

| | | |
|---|---|---|
| EP | 2006166 A1 | 12/2008 |
| EP | 2727775 A1 | 5/2014 |
| EP | 3345794 A1 | 7/2018 |
| EP | 3560772 A1 | 10/2019 |

* cited by examiner

AIRBAG SYSTEM FOR A VEHICLE AND METHOD FOR MANUFACTURING THE AIRBAG SYSTEM

TECHNICAL FIELD

The present disclosure relates to a safety device for a vehicle. The safety device is adapted to be arranged facing an airbag, said safety device comprising a channel, also called chute, suitable for receiving the airbag module and for guiding the airbag during its deployment, a panel and at least one net disposed within the panel and the channel.

The present disclosure further relates to an interior trim element of a vehicle comprising such a safety device.

The present disclosure also relates to a method of manufacturing such a safety device.

BACKGROUND

Usually, a vehicle comprises at least one safety device, or airbag system, intended to protect users of the vehicle in case of car accident. The safety device is for instance integrated with an interior trim element of the vehicle.

A safety device is generally intended to cooperate with an airbag module which receives a folded airbag able to be inflated by an inflation device. The safety device comprises channel which forms a guide to direct the deployment of the airbag when this latter is inflated by the inflation device. The channel comprises a through-opening through which the airbag is deployed in the interior of the vehicle to protect the users.

Generally, the channel is either integrated in the interior trim element, either assembled on the trim element.

More precisely, in case the channel is integrated in the interior trim element, the channel is molded together with the interior trim element (i.e. the channel and the interior trim element are molded at the same time, in the same mold). The channel and the interior trim element thus form a single piece.

In case the channel is assembled on the trim element, the channel and the interior trim element are molded separately (i.e. in two different molds) and assembled afterwards. More precisely, an assembly part, which comprises the channel, is assembled on the trim element. In other words, the channel and the interior trim element form two separate pieces, and the channel is provided with an assembly part, the assembly part being assembled on the trim element.

Generally, the through-opening of the safety device is covered by a deployment panel. The deployment panel can have different configurations depending on whether the channel is integrated in the interior trim element or assembled on the trim element.

In case the channel is integrated, the panel comprises one layer only, which corresponds to a portion of the interior trim element. In this case, the net (which is detailed below) is entrapped in this layer.

In case the channel is assembled, the panel comprises for example two layers. The two layers are for example welded together. Actually, a first layer (upper layer) of the panel is provided by the interior trim element and a second layer (lower layer) of the panel is provided by the assembly part other than the channel. The assembly part thus comprises at least the channel and the second layer (lower layer) of the panel. In such configuration, the net is entrapped in the lower layer (i.e. in the layer belonging to the assembly part).

Whatever the configuration of the deployment panel (depending whether the channel is assembled or integrated), the deployment panel is configured, for instance by means of a line of least resistance, to open during airbag deployment. The line of least resistance designs the outer contour of the panel. The line of least resistance is thus present on a portion of the interior trim element when the channel is integrated in the interior trim element, and in addition on a portion of the assembly part when the channel is assembled on the interior trim element. The through-opening is configured to be covered by the deployment panel in the absence of a crash, the deployment panel enabling the airbag deployment through the through-opening in case of a crash. Consequently, the airbag can be deployed in the interior of the vehicle through the through-opening of the channel. More precisely, in case of inflation of the airbag, the line of least resistance of the panel breaks, the panel opens and the airbag is deployed in the interior vehicle.

In addition, the deployment panel can comprise for example one flap (U-shape) or two flaps (H-shape, I-shape). In the case the deployment panel comprises two flaps, the line of least resistance also extends at the intersection of the flaps.

To protect the user of the vehicle, the safety device also comprises a flexible retention net which is arranged within the channel and within the deployment panel. More precisely, according to the configuration of the channel with the trim element, the net is entrapped whether in the only layer of the panel or in the lower layer of the panel. Indeed, when the channel is integrated in the trim element, the net is entrapped in the single layer of the panel. Furthermore, when the channel is assembled on the trim element, the net is entrapped in the layer of the assembly part which forms the lower layer of the panel (in other words, the net is not in the upper layer formed by the trim element).

The flexible retention net has a hinge function that allows the deployment panel to pivot. Thus, the flexible retention net maintains the deployment panel attached by the hinge to the interior trim element, during airbag deployment, in an area which is close to the interior trim element. In that sense, the deployment panel is not projected anywhere onto the vehicle interior and does not represent a risk of occupant injuries.

Usually, the flexible retention net has a first plane-portion which is disposed within (or entrapped in) the channel and second plane-portion which is disposed within (or entrapped in) the deployment panel. The flexible retention net also comprises a third portion which links the first plane-portion and the second plane portion. The third portion extends from an edge of the first-plane portion and from an edge of the second plane-portion.

Moreover the flexible retention net is generally folded to form the third-portion such that the flexible retention net has a T-shape or an S-shape when the flexible retention net is seen on a plane which is sensibly parallel to a plane which comprises a drive direction of the vehicle and for example a vertical direction relative to a normal use of a vehicle.

However, during airbag deployment, when the flexible retention net has an S-shape, the deployment panel immediately rotates during airbag deployment. More precisely, the deployment panel firstly rotates in the axis which corresponds to a transversal direction of the vehicle. Secondly, the deployment panel keeps rotating and also slightly translates toward the windscreen of the vehicle. Hence, the rotation axis of the deployment panel is slightly translated toward the windscreen during airbag deployment. Nevertheless, the S-shape flexible retention net has a kinematic behavior which is difficult to predict. Indeed, with an S-shape flexible retention net, the translation movement can intervene too early with regards to the rotation movement; this can cause the airbag to sneak into the interstice created by the third portion.

SUMMARY

An aim of the disclosure is to provide a safety device which has an appropriate and predictable kinematic behavior.

The present disclosure relates to a safety device for a vehicle adapted to be arranged facing an airbag, the safety device comprising: a channel suitable for guiding the airbag, the channel delimiting a central opening for deployment of the airbag, a panel at least partially covering the central opening when the airbag is in an uninflated state, and a net having a first plane-portion being entrapped in the channel and a second plane-portion being entrapped in the panel, the net further comprising a third portion extending between the first plane-portion and the second plane-portion, at least a part of the third-portion being entrapped in a receiving portion of the channel, wherein the receiving portion comprises at least a portion of reduced thickness.

The portion of reduced thickness provides a progressive and controlled opening movement of the panel.

In addition the safety device may comprise the following features, taken alone or in combination:
- the receiving portion has a first thickness and a second thickness, the first thickness being lower than the second thickness and wherein the portion of reduced thickness has the first thickness;
- the channel has an external face and an inner face opposite to the external face, the portion of reduced thickness having a round shaped viewed from the external face;
- the channel has an external face and an inner face opposite to the external face, the inner face being substantially flat over its entire surface;
- the channel comprises several portions of reduced thickness;
- the portions of reduced thickness extend along a direction identical to a direction along which the third portion extends;
- the third portion forms a hinge connection between the channel and the panel;
- the third portion corresponds to a folded portion of the net.

The portions of reduced thickness allow the third-portion of the net to be easily unfolded. Thus, the panel is easily released at the hinge.

The disclosure also provides an interior trim element of a vehicle comprising a safety device as described here above.

The disclosure also provides a method for manufacturing the safety device as above described, which comprises at least the following steps:
- disposing the net in an injection mold and injecting a melted material in the mold so as to form at least the channel and the panel;
- a slider is provided on the injection mold, the slider pressing the third-portion against the mold;
- the slider presses two layers of the net corresponding to the third-portion and a layer of the net corresponding to the second-plane portion;
- the third portion of the net is folded before disposing the net in the injection mold;
- the channel is assembled to an interior trim element.

BRIEF DESCRIPTION OF THE DRAWINGS

Other features and advantages of the disclosure will become apparent from the following description with reference to the accompanying drawings.

DETAILED DESCRIPTION

In the following description, the terms used to define the position and orientation, such as "front" and "rear", are understood to be relative to the position of a driver and to the direction of travel of the vehicle. The term "longitudinal" is defined as the front-rear direction and the term "transverse" is defined as being width-wise relative to the vehicle, meaning in a direction substantially perpendicular to the front-rear direction in a horizontal plane. The terms "upper" and "lower" are defined according to the elevation direction.

Figure 1:
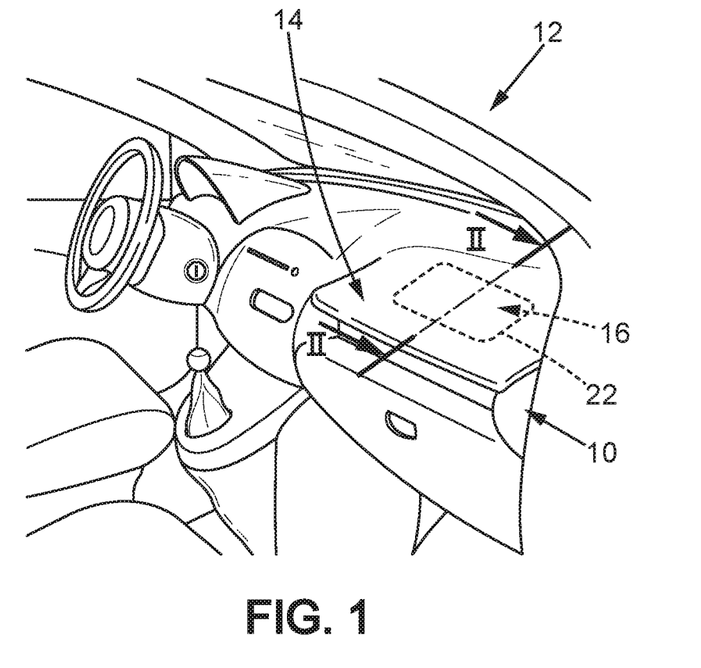
FIG. 1 is a perspective view of an interior of a vehicle which includes safety device of the disclosure.

Referring to the figures, it is described a safety device 16 adapted to be arranged facing an airbag. The vehicle interior trim element is, for example, as shown in a simplified manner in FIG. 1, a dashboard 10 of a vehicle 12. The vehicle interior trim element may, however, be any type of trim element such as a door panel or other element.

The dashboard 10 comprises, among other things, a rigid support layer 14, often referred to as the "dashboard body" by a person skilled in the art, and a safety device 16 housed under or within the dashboard body 14. In the example illustrated in FIG. 1, the safety device 16 is on the passenger side. However, the safety device 16 may be wherever else necessary. The dashboard body 14 is for example manufactured by an injection type molding operation. The dashboard body 14 is molded using thermoplastic-type plastics, such as polypropylene PP, with or without fiber reinforcement or mineral filler depending on the stiffness desired. Alternatively, the material used may be PC/ABS (Polycarbonate/Acrylonitrile Butadiene Styrene).

Alternatively, the dashboard 10 further comprises a skin covering at least a portion of the dashboard body 14. This skin is made for example of PVC (polyvinyl chloride), TPO (thermoplastic polyolefin), TPU (thermoplastic polyurethane), or any other thermoplastic material which can provide a flexible skin. Alternatively, a layer of foam can be present between the dashboard body 14 and the skin. Alternatively, the dashboard body 14 may be covered with leather or a leather substitute. In that case, a soft fabric layer (also called "3D soft fabric") can be present between the dashboard body and the leather or substitute.

Figure 2:
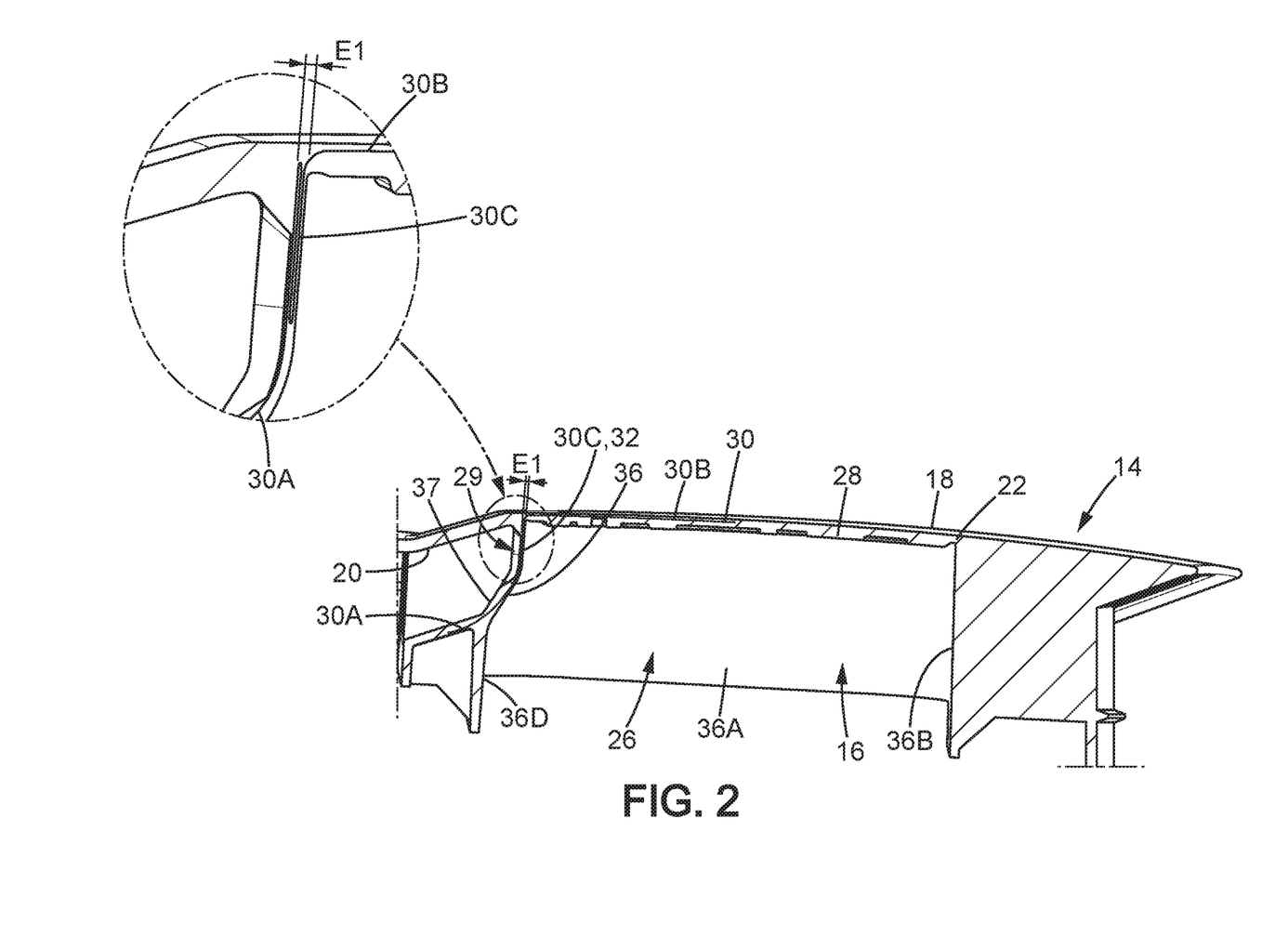
FIG. 2 is a cross-sectional view of FIG. 1 according to the plane II-II of FIG. 1.
Figure 3:
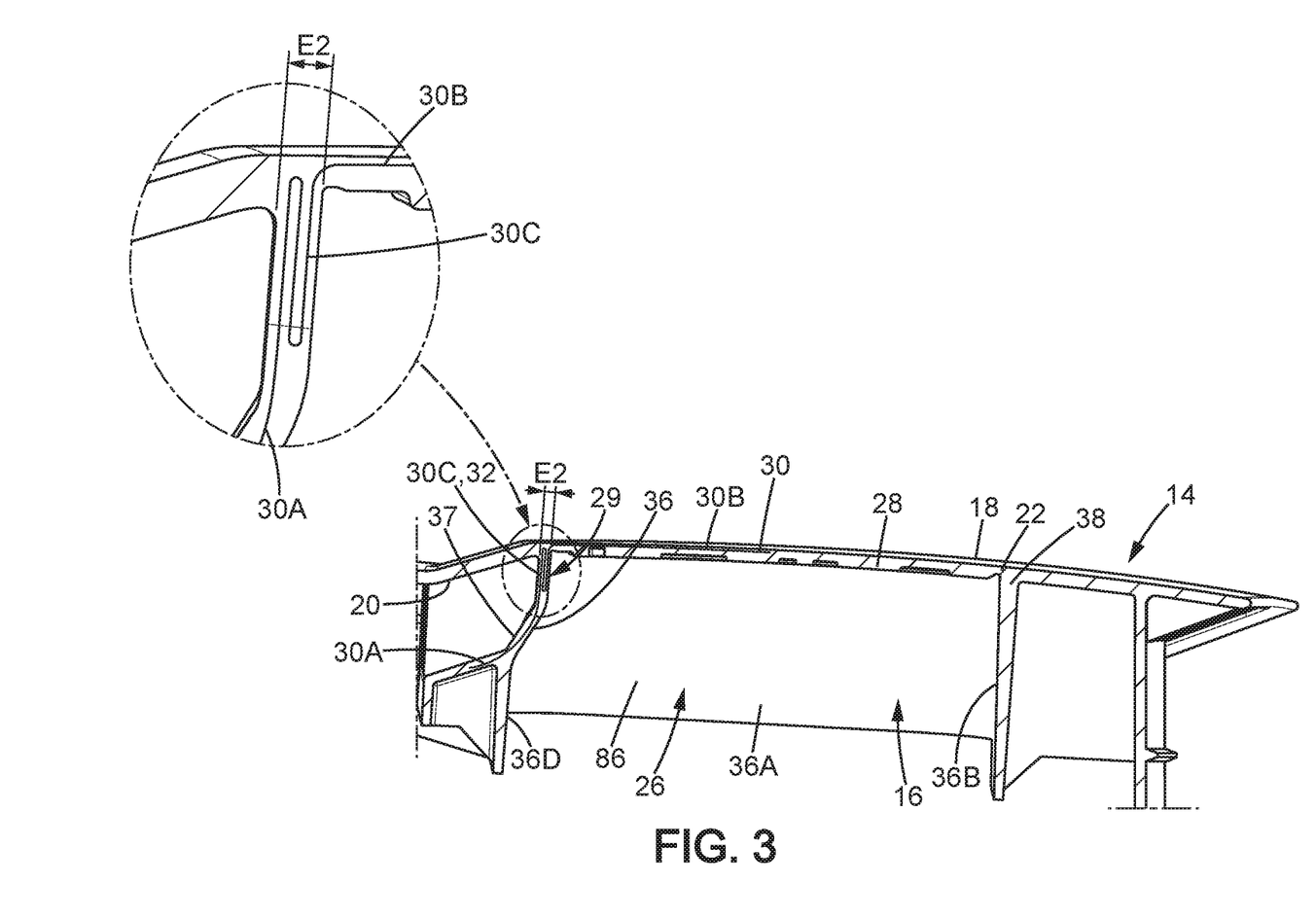
FIG. 3 is a cross-sectional view of FIG. 2 according to a parallel plane of the plane II-II of FIG. 1.

Referring to FIGS. 2 and 3, the dashboard body 14 has an outer surface 18, visible to an occupant of the vehicle 12, and an inner surface 20.

The dashboard body 14 has a line of least resistance 22. The line of least resistance 22 is for example formed by a score made on the inner surface 20. In such configuration, the line of least resistance 22 is not visible from the outside of the dashboard 10.

The line of least resistance 22 is obtained in a conventional manner, for example removing material by milling or by laser beam or by a thickness decrease generated by an injection mold local shape.

In the example described here, the line of least resistance 22 is a closed continuous line which, in a plan view (FIG. 1), has a substantially rectangular shape. Alternatively, this closed continuous line may have a substantially trapezoidal shape. In a variant, the line of least resistance 22 may be a continuous open line which in a plan view is substantially U-shaped with the open side towards the front of the vehicle 12. In another variant, the line of least resistance 22 may appear, in a plan view, substantially I-shaped or H-shaped.

The safety device 16 comprises a channel 26, a panel 28 and a net 30. The safety device 16 is intended to cooperate with an airbag module, not illustrated. An airbag is arranged in the airbag module in an initial folded position as well as an airbag inflation apparatus. The airbag inflation apparatus is for example a gas or pyrotechnic device, triggered when the vehicle 12 experiences a crash.

In the example represented for example in FIG. 2 and in FIG. 3, the channel 26 is integrated to the dashboard body 14. It means that the channel 26 and the dashboard body are made in one piece.

Alternatively, the safety device 16 comprises an assembly part. The assembly part comprises the channel 26. In this configuration, the assembly part is assembled to the dashboard body, for example by means of vibration welding, infrared welding, or other technique.

Figure 4:
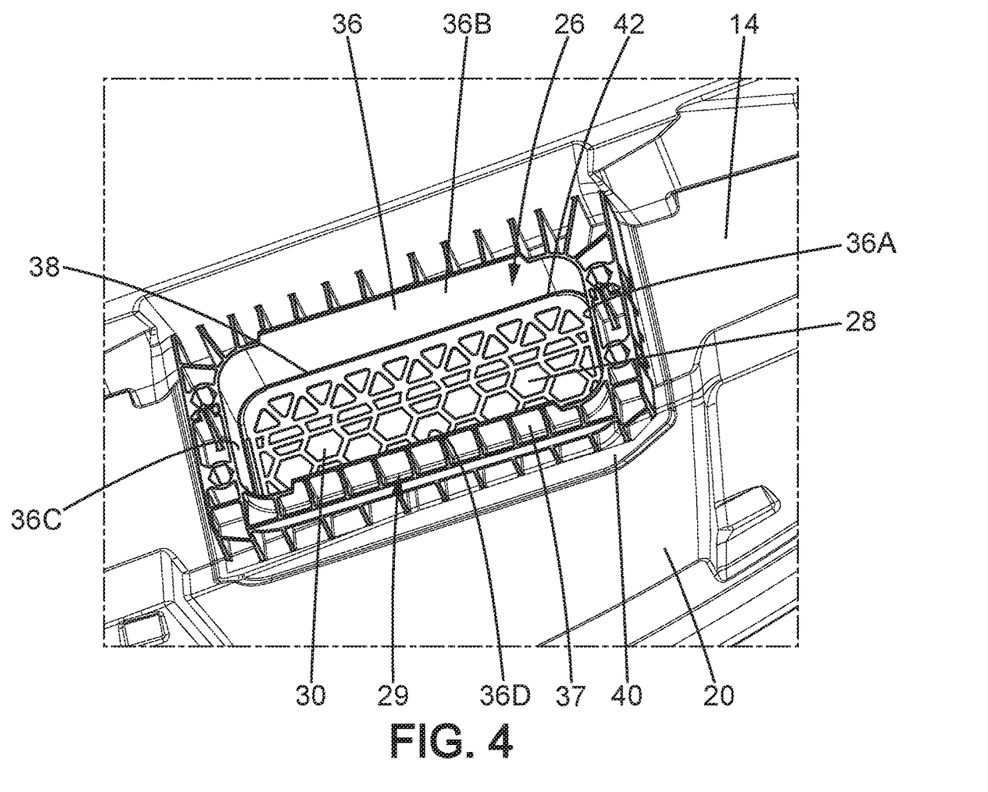
FIG. 4 is a perspective view of a channel.

As depicted for example in FIG. 4, the panel 28 has a substantially rectangular shape corresponding to the shape of a central opening 42 so as to cover the central opening 42 when the airbag is in the non-inflated state. Alternatively, the panel 28 has a substantially trapezoidal shape.

When the channel 26 is integrated in the dashboard body 14, the panel 28 is formed by a portion of the dashboard body 14. Otherwise, when the channel 26 is assembled on the dashboard body 14, the panel 28 is formed by a portion of the dashboard body 14 and a portion of the assembly part. More precisely, the portion of the assembly part that makes a part of the panel 28 correspond to the portion of the assembly part that covers the through opening (central opening 42) of the channel 26.

As depicted in FIGS. 2 and 3, the net 30 comprises a first plane-portion 30A and a second plane-portion 30B.

By "plane-portions", it should be understood that said portions of the net 30 are not folded on themselves. Said first and second plane-portions 30A, 30B of the net 30 do not form a loop. At least one of the first plane-portion 30A and second plane-portions 30B can be slightly curved. For example and as can be seen on FIG. 2 and FIG. 3, the first plane-portion 30A is slightly curved.

The first plane-portion 30A is disposed within the channel 26. The second plane-portion 30B is disposed within the panel 28. More precisely, the first plane-portion 30A and the second plane-portion 30B are encapsulated (i.e. entrapped) within respectively the channel 26 and the panel 28. Actually, the first plane portion 30A and the second plane portion 30B are held in the plastic material of the channel 26 and the panel 28. Preferably, the first plane portion 30A and the second plane portion 30B are fully encompassed by the plastic material, in other words the first plane portion 30A and the second plane portion 30B are completely embedded in plastic material and are not visible from the outside. However, even if it does not appear to be a favorite embodiment, it is possible to not completely cover the first plane portion 30A and the second plane portion 30B of plastic and/or predict areas where the first plane portion 30A and the second plane portion 30B are not completely embedded in plastic. For example, some areas of the first plane portion 30A and the second plane portion 30B extend on a surface of respectively the channel and the panel.

Furthermore, the net 30 comprises a third portion 30C. The third portion 30C extends between the first plane-portion 30A and the second plane-portion 30B. As it can be seen on FIG. 4, the third portion 30C corresponds to a folded portion of the net 30. The third portion 30C forms a loop of the net. More precisely, the third portion 30C has a substantially S-shape cross-section. In other words, the third portion 30C is folded by forming an S-shape. By "S-shape", it should be understood that the third portion 30C comprises preferably two layers of the net 30 forming the loop and that said loop is folded against the first portion 30A of the net 30. The third portion 30C is thus folded twice on itself. Actually, the third portion 30C forms a hinge connection 32 between the channel 26 and the panel 28. In other words, the panel 28 is connected to the channel 26 by the hinge connection 32. The panel 28 is thus hinged relative to the channel 26 substantially about a transverse axis.

The net 30 is intended to prevent the panel 28 from injuring a passenger of the vehicle during airbag deployment. More precisely, the net 30 keeps the panel 28 attached to the dashboard body 14. The net 30 also directs the motion of the panel 28 during airbag deployment. Upon deployment of the airbag, the panel 28 swings forward about a substantially transverse axis which is not fixed, therefore with more freedom in comparison with a rotation about a fixed axis. In other words, the net 30 allows the panel 28 to rotate above the fixed part of the dashboard body 14 (i. e. above the skin of the dashboard 10).

According to an example of the disclosure, the panel 28 comprises at least one flap.

In the example illustrated in the figures, the panel 28 comprises one flap and the safety device 16 comprises one net 30.

In another example, the panel 28 comprises two flaps. In this example, the safety device 16 can comprise one net 30 or the safety device 16 can comprise two nets 30. In the case of the safety device 16 comprises one net 30, the net 30 is cut afterward at the flaps split line so as to allow the opening of the flaps. In the case of the safety device 16 comprises two nets 30, each of the nets 30 links one of the flaps to the channel 26. One net 30 is attached to a first flap of the panel 28 and to the front long side of the channel 26 and the other net 30 is attached to a second flap of the panel 28 and to the rear long side of the channel 26.

The channel 26 is adapted to guide the airbag during the deployment of the airbag.

As can best be seen in FIG. 4, in which the airbag module has been omitted for clarity, the channel 26 has, for example, a substantially rectangular cross-section. Alternatively, the channel 26 has a substantially trapezoidal cross-section. The channel 26 has a surrounding wall. The surrounding wall has an inner face 36 and an external face 37.

The external face 37 is opposite to the inner face 36.

The inner face 36 is formed by two short sides 36A, 36C and two long sides 36B, 36D (i. e. two short lengths and two long lengths). The surrounding wall further extends at its upper end, substantially radially, by a peripheral flange 40. The peripheral flange 40 is integrated to the dashboard body 14, for example by molding. Alternatively, the peripheral flange 40 is assembled to the inner surface 20 of the dashboard body 14, for example by means of vibration welding, infrared welding, or other technique.

In the example of FIG. 3, the upper end 38 of the inner face 36 is arranged substantially facing the line of least resistance 22 and thus delimits the central opening 42 for deployment of the airbag.

The central opening 42 has a substantially rectangular shape corresponding to the shape of the cross-section of the channel 26. Alternatively, the central opening 42 has a substantially trapezoidal shape.

Figure 5:
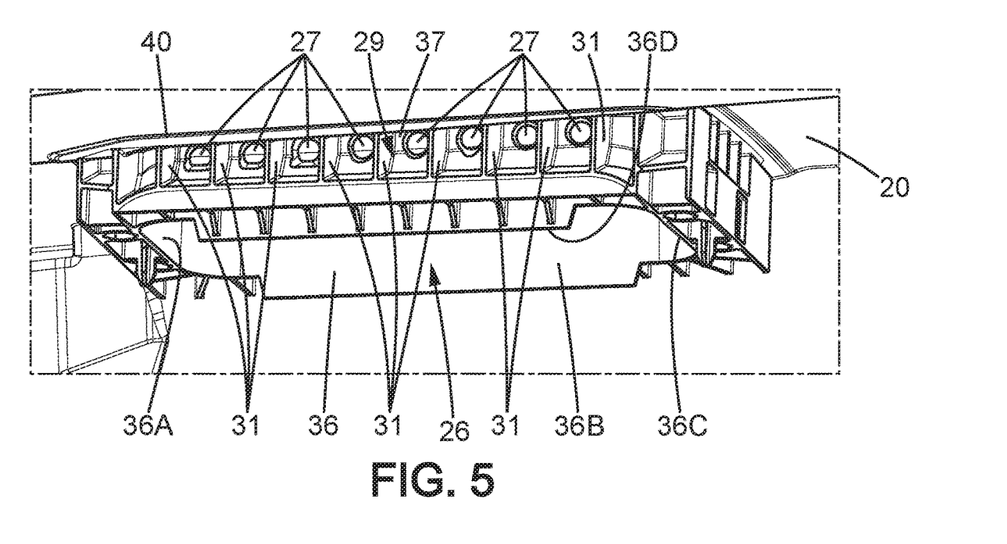
FIG. 5 is another perspective view of the channel.

FIG. 5 shows a perspective view of the channel 26. It can be seen in this FIG. 5 that the channel 26 comprises a receiving portion 29. The receiving portion 29 corresponds to a portion of the channel 26 within which the third portion 30C of the net 30 is entrapped. The receiving portion 29 comprises at least a portion of reduced thickness 27.

As depicted in the example illustrated in FIG. 5, the portions of reduced thickness 27 are formed on the external face 37, opposite to the long side 36D. It should be noted that FIG. 5 illustrates a panel 28 with one flap. In case the panel 28 comprises two flaps, each flap comprising a hinge connection 36, the portions of reduced thickness 27 may be arranged on the external face 37 opposite to each long side 36B, 36D.

FIG. 2 and FIG. 3 show that the channel 26 has different thickness. More precisely, the channel 26 has at least two different thicknesses E1 and E2 between the inner face 36 and the external side 37.

The first thickness E1 corresponds to the thickness of the channel 26 at the location of a portion of reduced thickness 27. The second thickness E2 corresponds to the thickness of the channel 26 where there is no portion of reduced thickness 27. In other words, the thickness of the channel 26 is reduced where there is a portion of reduced thickness 27.

The first thickness E1 is lower than the second thickness E2. For example, the first thickness E1 is slightly higher than 3 times the thickness of the net 30. The third portion 30C is therefore well maintained in a portion of reduced thickness 27 comprising a first thickness E1 since the dimension of the first thickness E1 is only slightly higher than the thickness of the three layers of the net 30. In a further example, the second thickness E2 is approximately 1.5 to 4 times the first thickness E1. For example, the first thickness E1 is between 0.5 mm and 1.5 mm, for example equal to 0.7 mm. The second thickness E2 is for example between 1 mm and 4 mm, for example equal to 1.5 mm.

The portions of reduced thickness 27 are barely visible from the inner face 36. This means that the inner face 36 is approximately smooth over its entire surface: the surface of the inner face 36 stills substantially flat between a portion of the channel 26 having a first thickness E1 and a portion of the channel 26 having a second thickness E2. Still regarding the example illustrated in FIG. 5, the portions of reduced thickness 27 are round shaped. In other words, the portions of reduced thickness 27 have a round shaped viewed from the external face 37. However, the portions of reduced thickness 27 may have other different form. For example, the portions of reduced thickness 27 may be square, oval or triangular. Furthermore, in the example depicted in FIG. 5, the channel 26 comprises eight portions of reduced thickness 27. However, the channel 26 may comprise less or more portions of reduced thickness 27. For example, the channel 26 may comprises five to fifteen portions of reduced thickness 27. In addition, each portion of reduced thickness 27 is separated from others by a rib 31. Regarding the example of FIG. 5, ribs 31 are provided on the external side 37, to reinforce the channel structure.

Furthermore, the portions of reduced thickness 27 are located along the third portion 30C of the net 30. This means that the portions of reduced thickness 27 extend along a direction identical to a direction along which the third portion 30C extends. For example, when the third portion 30C extends along the long side 36D, the portions of reduced thickness 27 are arranged one to another along the long side 36D. Portions of reduced thickness 27 make the net 30 easier to release from the channel 26 compared to a channel without portions comprising a reduced thickness.

Thus, the present reduced thickness 27 allows a release of the third portion 30C in order for the panel to move upward from the support (the fixed part of the dashboard body 14) and therefore to allow the rotation of the panel and to avoid compression stresses in the hinge area. More precisely, thanks to the portions of reduced thickness 27, the third portion 30C is easier unfolded under pressure of the airbag during its deployment. Indeed, the portion of reduced thickness 27 pushes globally the net 30 towards the inner face 36 of the channel 26. This allows the third portion 30C of the net 30 to deploy on the inner side of the channel 26. Furthermore, it avoids the walls of the channel 26 to break or the third portion 30C of the net 30 to stay blocked in the channel 26 during airbag deployment. In other words, this leads to a better kinematic behavior of the opening of the panel because the kinematic behavior is more predictable. Indeed, the portions of reduced thickness 27 make easier the unfolding of the third portion 30C and control the kinematic of the opening of the panel 30. However, in order the net 30 is not too early released and the panel starts going up at an early stage of the deployment, the third portion 30C, entrapped in portions of reduced thickness 37, should still face a predetermined force to have good kinematics. Therefore, the dimensions of the portions of reduced thickness 27 and their number are tuned according to, for example, the safety device 16 and/or the specificities of the vehicle and its dashboard 10.

Additionally, the net 30, and especially the first plane portion 30A, is well maintained within the channel 26 because of the areas where there is a thickness E2. Thus, this is the combination of two different thickness E1 and E2 between the long side 36D and the external side 37 of the channel 26 that allows the net 30 to be well maintained within the channel 26 and to be unfolded.

A method for manufacturing safety device 16 is described hereinafter.

First, providing a pre-folded net 30. The pre-folded net 30 forms at least the loop of the third portion 30C. For example, the pre-folded net forms only the loop of the third portion 30C, the first portion 30A and the second portion 30B extending according to a single linear direction. According to another example, the pre-folded net 30 forms additionally a corner profile between the first portion 30A and the second portion 30B so as to fit the angle between the channel 26 and panel 28.

Then, disposing the net 30 in an injection mold. This step could be done using a gripper. For example, the net 30 is centered on the injection mold by means of protruding pins of the mold corresponding to openings of the net.

Then, closing the injection mold. At least a slider is provided on the injection mold in order to form the portions of reduced thickness. For example, during the mold closing step a slider moves at the same time that the mold closes. For example, a slider is a part of the mold which is able to move along a slider direction which is different from the mold closing direction. It allows creating undercuts, namely parts such as the portion of reduced thickness 27.

Once the mold is completely closed, the slider maintains the third portion 30C in a portion which is intended to define the portions of reduced thickness 27. The slider presses the third portion 30C of the net 30 against the mold portion intended to delimit the inner face 36 and more particularly the long side 36D of the inner face 36. The slider maintaining the third portion 30C allows the third portion 30C to be maintained during a further injection step. Indeed, the third portion 30C cannot bend and move along the external face 37 of the surrounding wall and/or be randomly disposed within the thickness of the channel 26. Therefore, this enables a more predictable and controlled panel opening during airbag deployment.

As the third portion 30C of the net 30 is intended to be entrapped on a part of the channel 26 and the first plane-portion 30A of the net is also intended to be entrapped in the channel 26, the slider presses two layers of the net corresponding to the third portion 30C of the net and one layer corresponding to the first plane-portion 30A of the net against the mold portion intended to delimit the inner face 36.

Further, a melted material is injected in the mold. At this stage, in case of an assembled channel, the mold forms the assembly part, and in case of an integrated channel, the mold forms the entire dashboard body (or trim element). The net 30 is thus overmolded by the melted material during the injection.

After the injection step, the mold opens and the molded part is ejected from the mold.

Alternatively, when the channel is an assembled channel, the assembly part is then assembled to the interior trim, for example by welding.

The invention claimed is:

1. A safety device for a vehicle, the safety device being adapted to face an airbag and comprising:
   a channel suitable for guiding the airbag, the channel delimiting a central opening for deployment of the airbag,
   a panel at least partially covering the central opening when the airbag is in an uninflated state, and
   a net having a first plane-portion being entrapped in the channel and a second plane-portion being entrapped in the panel, the net further comprising a third portion extending between the first plane-portion and the second plane-portion,
   wherein the third portion comprises two layers of the net forming a loop, the loop being folded against the first plane-portion and entrapped in a receiving portion of the channel, the receiving portion comprising at least a portion of reduced thickness.

2. The safety device of claim 1 wherein the receiving portion has a first thickness and a second thickness, the first thickness being lower than the second thickness and wherein the portion of reduced thickness has the first thickness.

3. The safety device of claim 1, wherein the channel has an external face and an inner face opposite to the external face, the portion of reduced thickness having a round shaped viewed from the external face.

4. The safety device of claim 1, wherein the channel has an external face and an inner face opposite to the external face, the inner face being substantially flat over its entire surface.

5. The safety device of claim 1, wherein the channel comprises several portions of reduced thickness.

6. The safety device of claim 1, wherein the portion of reduced thickness extends along a direction identical to a direction along which the third portion extends.

7. The safety device of claim 1, wherein the third portion forms a hinge connection between the channel and the panel.

8. The safety device of claim 1, wherein the third portion corresponds to a folded portion of the net.

9. Interior trim element of a vehicle comprising the safety device of claim 1.

10. Method of manufacturing the safety device of claim 1, wherein the method comprises disposing the net in an injection mold and injecting a melted material in the mold so as to form at least the channel and the panel.

11. The method of claim 10, wherein a slider is provided on the injection mold, the slider pressing the third portion against the mold.

12. The method of claim 11, wherein the slider presses the two layers of the net corresponding to the third portion and a layer of the net corresponding to the second plane-portion.

13. The method of claim 10, wherein the third portion of the net is folded before disposing the net in the injection mold.

14. The method of claim 10, wherein the channel is assembled to an interior trim element.

* * * * *